Nov. 30, 1926.
A. P. LADD
1,608,984
VEHICLE SIGNAL
Filed Oct. 7, 1922
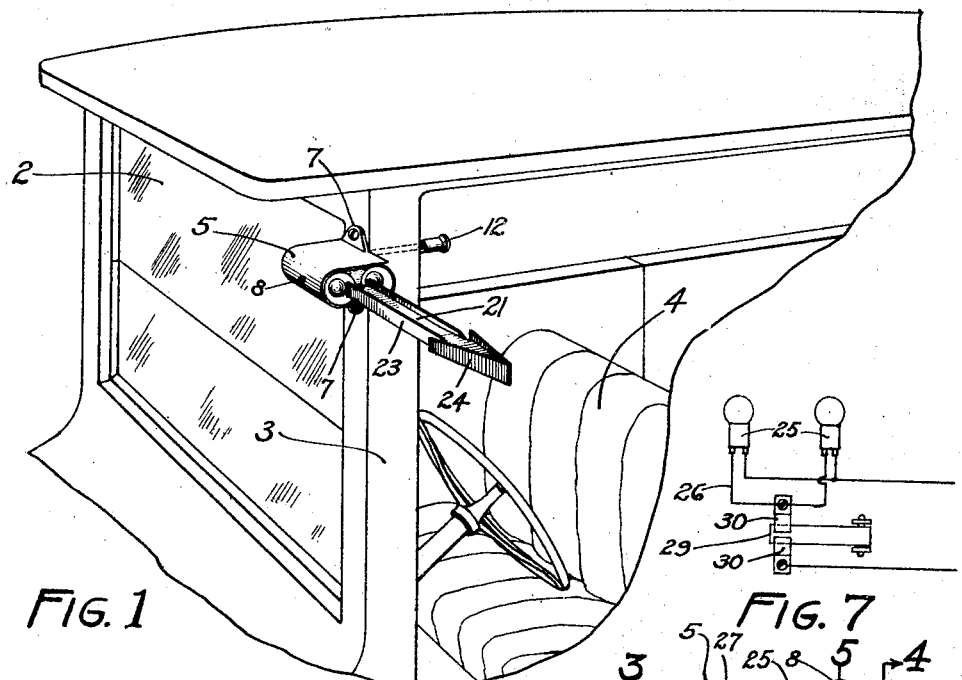
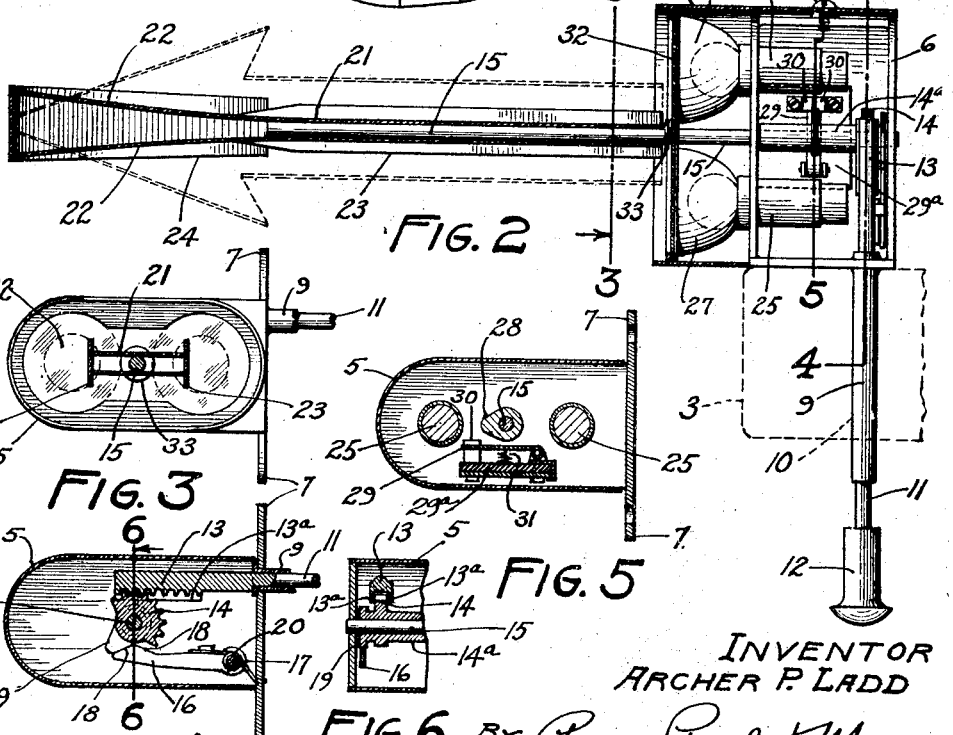
INVENTOR
ARCHER P. LADD
ATTORNEYS Patented Nov. 30, 1926.

1,608,984

UNITED STATES PATENT OFFICE.

ARCHER P. LADD, OF MINNEAPOLIS, MINNESOTA.

VEHICLE SIGNAL.

Application filed October 7, 1922. Serial No. 593,091.

The object of my invention is to provide a visible signal designed particularly for use with automobiles and other power-propelled vehicles for the purpose of indicating, in day time or night time, to drivers of other cars or vehicles that the one using the signal is about to change the direction of movement, turning either to the right or the left as the case may be.

A further object is to provide a signaling device which can be easily attached to the front of the car within convenient reach of the driver and quickly operated to form a signal to the drivers of other cars.

A further object is to provide a signaling device which will be automatically illuminated when the lights are turned on the car without the operation of any special switch.

A further object is to provide a signaling device of simple, inexpensive construction which will not easily get out of order and can be applied to any style or type of car at a comparatively small expense.

The invention consists generally in various constructions and combinations all as hereinafter described and particularly pointed out in the claims.

In the accompanying drawings forming part of the specification,

Figure 1 is a perspective view of a portion of the top of a closed car showing my invention applied thereto;

Figure 2 is a detail sectional view showing the preferred manner of operating the signal;

Figure 3 is a sectional view on the line 3—3 of Figure 2;

Figure 4 is a sectional view on the line 4—4 of Figure 2;

Figure 5 is a sectional view on the line 5—5 of Figure 2;

Figure 6 is a sectional view on the line 6—6 of Figure 4;

Figure 7 is a detail view of the arrangement of the lights and the wiring thereto.

In the drawing, 2 represents the top of a closed car having an upright post or rail 3 at the front adjacent the driver's seat 4. Upon this post, near the top thereof, I provide a shell or housing 5 enclosing a frame 6 having ears 7 for securing the frame and housing to the wall of the post or standard. The housing is secured to the frame by suitable means such as screw 8 which when removed allows access to the operating mechanisms of the device.

The frame has a hollow stud 9 projecting through an opening 10 in the post 3 and adapted to receive a rod 11 that is slidable in said stud and provided with a hand-grip 12 on the inside of the car. The inner end of the rod 11 has a rack-bar 13 formed thereon, adapted to mesh with the teeth of the pinion 14, preferably integral with a sleeve 14$^a$, that is secured on a rock-shaft 15 which projects forwardly through the frame at right angles substantially to the rod 11 so that when this rod is moved longitudinally, a rocking movement will be imparted to the shaft 15. Depending flanges 13$^a$ are provided on each side of the rock bar 13 adapted to engage the ends of the teeth of the pinion 14 to prevent the rod 11 from turning in the stud 9, shown in Figures 4 and 7.

A dog 16 is pivoted at 17 and has beveled surfaces 18 normally held in contact with a lug 19 on the sleeve 14$^a$ by the tension of a spring 20; the lug seating itself on the inclined surfaces through the tension of the spring and insuring the movement of the shaft the same distance with each stroke of the operating rod. The shaft 15 projects outwardly through the frame and beyond the housing 5, and has an arrow 21 mounted thereon. The arrow has flat surfaces painted some distinguishing color, preferably red and white, and at its outer end its walls diverge or flare as indicated at 22, so that the rays of the light will be directed more clearly thereon, and aid the drivers of other cars in distinguishing the arrow in the darkness.

Flanges 23 are also provided on each longitudinal edge of the arrow, and at the pointed outer end similar flanges 24 are formed, and these may be painted some contrasting color, as black; the flanges 24 converging, and their inner ends extending beyond the adjacent ends of the flanges 23, and forming the barbs of the arrow. The arrow is flattened in form, and when the shaft is in its normal position, the plane of the arrow will be parallel with the direction of movement of the car and it will be practically invisible to drivers of other cars, or at least will present only a narrow line to the vision, and not be understood as a signal. When, however, the rod is pulled out by the driver, the shaft will be rotated a quarter turn or 90 degrees, and the plane of the arrow will then be at right angles to the direction of movement of the car, and the vividly painted surfaces of the arrow will be plainly visible to drivers in front or in the rear of the vehicle on which the arrow is mounted.

Upon each side of the shaft 15 within the housing 5, I provide light sockets 25 for small incandescent lamps having an electric circuit 26 with the lighting system of the car. Preferably one wire is attached to the tail light wire terminal or to the tail light wire, and the other wire grounded to the frame of the car. It is not necessary therefore to pay any attention to the electric connections for night use, for when the driver turns on his lights at night, the signal lights will be in the same circuit, and when either the dimmer lights or the head lights are turned on, the signal will be ready for night use, or whenever the tail light is in use, thus the lighting of the signal is in a sense automatic, no independent switch being necessary, the lights being turned on or off with the lighting of the car. Reflectors 27 are provided for the lights and when the circuit is closed, the rays of light will be thrown out on the surface of the arrow, and striking the outwardly inclined surfaces 22 will cause the arrow to be plainly visible in the darkness to any other driver in front or in the rear of the car. The lamps will be dark except at such times when the driver operates the rod 11, and then only in day time or when tail light is not in use.

A cam 28, preferably integral with the sleeve 14ª, is provided and adapted to be engaged by a circuit closing bar 29, pivotally mounted upon a suitable nonconductive supporting plate 29ª, secured to the frame 6. Suitable contacts 30 are also secured to the supporting plate 29ª, adapted to be engaged by the bar 29 when said bar is in the circuit closing position, shown in Figure 5. A compression spring 31 is interposed between the bar 29 and the plate 29ª to hold the bar 29 against the contacts 30 to close the circuit. When the arrow is in its normal position, as shown in Figure 1, the cam 28 will be in engagement with the bar 29, depressing said bar against the tension of the spring 31, and thereby breaking the circuit.

When the driver operates the rod 11 to rotate the arrow on a longitudinal axis and presents its flat vertical face to the vision of the other drivers, the circuit closing bar 29 will be operated when the light circuit is on and will be moved into engagement with the contacts 30 to close the circuit between them and flash the lights on the arrow. When the arrow is returned to its normal position, with only its narrow edge presented to the vision of drivers of other cars, than the circuit will be broken through the lamps, and the arrow will be in darkness until such time as the driver wishes again to indicate a change in the direction of travel of the car.

A transparent plate 32, of any suitable material, such as celluloid or glass, is provided to protect the lamps and reflectors. A circular collar or flange 33 is secured to the shaft 15 adjacent the plate 32, to prevent moisture from getting into the device through the aperture in the plate 32.

The lamps are located as shown in Figure 2 upon opposite sides of the shaft which supports the arrow, and when the circuit is closed, the rays of light will be thrown outwardly upon both the front and rear face of the arrow so that it will be plainly visible to drivers of cars or pedestrians in front and in the rear of the car to which the signal is attached. The indicator or arrow is shown projecting outwardly at right angles from the car, but it will not project beyond the outer edge of the running board or the mud guard, so that even though it is permanently mounted in this position, it would be clear of passing vehicles or other obstacles.

I claim as my invention:

1. A vehicle signal comprising an indicator adapted to be mounted on a car and normally projecting outwardly therefrom to rotate on a longitudinal axis and without longitudinal movement and having indicating and non-indicating faces, the former curved outwardly in opposite directions and mechanism adapted to be operated by the driver for rocking said indicator on its longitudinal axis to alternately expose and conceal said indicating faces.

2. A vehicle signal comprising an indicator adapted to be mounted on a car and normally projecting outwardly therefrom to rotate on a longitudinal axis and without longitudinal movement, and having indicating and non-indicating faces, the former broadened and curved outwardly at the outer extremity, mechanism within control of the driver for rocking said indicator to alternately expose and conceal said indicating faces, and suitable lights arranged upon opposite sides of said indicator and adapted to throw their rays upon the indicating faces thereof when adjusted for their indicating position.

3. A vehicle signal comprising an arrow mounted to rotate upon a longitudinal axis and flattened in form and in its non-indicating position being in a plane parallel substantially with the direction of movement of the vehicle, the indicating faces of said arrow being provided with contrasting colors and being outwardly flared to attract the attention of other drivers, and being exposed when said arrow is rotated to a position at right angles to its normal plane and lights mounted to direct their rays upon said contrasting colors and curved surfaces and render the indicating surfaces more conspicuous.

4. A vehicle signal comprising an indicator adapted to be mounted on a car and projecting outwardly therefrom to rotate on a longitudinal axis and without longitudinal movement, a shaft whereon said indicator is mounted adapted to be rotated a quarter turn, a rod geared to said shaft and adapted to be pulled outwardly to rotate said shaft and indicator, said indicator having indicating and non-indicating surfaces thereon, said indicating surfaces being on the wider faces of the indicator and alternately exposed and concealed as the indicator is rotated, and means for directing rays of light outwardly along the faces of said indicator to render the same visible to the drivers of other cars.

5. A vehicle signal comprising a shaft, a housing therefor, and means for mounting it on a vehicle, an arrow mounted on said shaft to project outwardly from the vehicle and having a rotary movement only with said shaft, mechanism within control of the driver for rotating said shaft and arrow, said arrow having flanged edges and outward flaring walls between said flanged edges at the end of the arrow in contrasting colors and lamps for throwing rays of light lengthwise of the arrow and upon the flanged edges and flaring surfaces at the outer end thereof.

6. A vehicle signal comprising an arrow mounted to rotate on a longitudinal axis and comprising a flat plate with a tapered outer end, and flanges secured to the longitudinal edges of said plate and said outer end and projecting outwardly on each side beyond the surfaces of said plate, and lights mounted at the inner end of said arrow upon opposite sides of the axis thereof and adapted to throw their rays upon the surfaces of said plate when it is rotated to a vertical plane.

7. The combination with a car top standard, of a frame mounted thereon, a housing for said frame, a rock shaft mounted in said frame, a rod operatively connected with said rock shaft and projecting through said standard and having a finger grip within convenient reach of the driver, an arrow mounted on said rock shaft and projecting outwardly therefrom to rotate therewith, movement of said rod rocking said shaft and arrow a quarter revolution without longitudinal movement to present flat longitudinal surfaces of said arrow or longitudinal edges thereof to the vision of other drivers, and lamps arranged to throw their rays of light upon opposite surfaces of said arrow.

8. A housing having a sleeve adapted to pass and project inwardly through the post of a windshield to secure the housing, a rockshaft as a signal carrier rotatably journaled in and projecting from the housing, a push-rod slidable and non-rotatable in said sleeve, and having geared connection with said rockshaft, a stop mechanism for limiting rotative movement of the shaft through an arc of 90 degrees, a cross-sectionally I-shaped arrow rotatable with said rockshafts providing flat faces flanked by flanges and having its flat faces of greatest area flared outwardly at the head end and differently colored, lamps in the housing symmetrically positioned to simultaneously illuminate respective opposite vertically positioned sides of the arrow when in signalling position, circuits for the lamps including a switch, and switch control means on the rockshaft for opening the switch when the arrow is in non-signalling position.

9. A signalling arrow for the purpose described cross-sectionally I-shaped and providing flat faces flanked by flanges having its faces of greatest area flared outwardly at the head end and said faces differently colored.

In witness whereof, I have hereunto set my hand this 4th day of October 1922.

ARCHER P. LADD.